United States Patent
Singh et al.

(10) Patent No.: US 11,245,727 B2
(45) Date of Patent: Feb. 8, 2022

(54) ADAPTIVE IDENTITY BROKER FOR GOVERNANCE OF DECENTRALIZED IDENTITIES ACROSS MULTIPLE HETEROGENEOUS IDENTITY NETWORKS

(71) Applicant: International Business Machines Corporation, Armonk, NY (US)

(72) Inventors: Kapil Kumar Singh, Cary, NC (US); Joshua F. Payne, San Antonio, TX (US); Ashish Kundu, Elmsford, NY (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 16/414,254

(22) Filed: May 16, 2019

(65) Prior Publication Data
US 2020/0366716 A1  Nov. 19, 2020

(51) Int. Cl.
*H04L 29/06* (2006.01)
*G06N 20/00* (2019.01)
*G06F 21/62* (2013.01)

(52) U.S. Cl.
CPC .......... *H04L 63/20* (2013.01); *G06F 21/6236* (2013.01); *G06F 21/6245* (2013.01); *G06N 20/00* (2019.01); *H04L 63/08* (2013.01); *H04L 63/0815* (2013.01); *H04L 63/10* (2013.01)

(58) Field of Classification Search
CPC .......... H04L 63/20; H04L 63/08–0892; H04L 63/10–108; G06F 21/30–36; G06F 21/62–629; G06N 20/00
See application file for complete search history.

(56) References Cited

U.S. PATENT DOCUMENTS

| | | | |
|---|---|---|---|
| 8,856,957 B1 * | 10/2014 | Roth | G06F 21/33 726/28 |
| 10,027,662 B1 * | 7/2018 | Mutagi | G10L 15/22 |
| 10,630,673 B1 * | 4/2020 | Lingampally | H04L 63/0815 |
| 2008/0010288 A1 * | 1/2008 | Hinton | H04L 63/0815 |
| 2009/0271856 A1 * | 10/2009 | Doman | H04L 63/20 726/9 |

(Continued)

OTHER PUBLICATIONS

Haddouti SE, Kettani MD. Towards an interoperable identity management framework: a comparative study. arXiv preprint arXiv: 1902.11184. Feb. 28, 2019. (Year: 2019).*

(Continued)

*Primary Examiner* — Madhuri R Herzog
(74) *Attorney, Agent, or Firm* — Law Office of Jim Boice

(57) ABSTRACT

A method provides a network-agnostic identity broker for retrieving identity records across heterogeneous identity networks. An identity broker receives a client request from a client to retrieve and evaluate user identity information for confirming an identity of a particular entity. The identity broker utilizes a group membership of the client to select a set of policies for handling the client request, and selects an identity network from multiple heterogeneous identity networks as a selected identity network to which the client request is to be sent. The identity broker sends the client request to the selected identity network, and then receives a response from the selected identity network. The identity broker evaluates the response according to the set of policies, such that the evaluated response conforms with the set of policies, and transmits the evaluated response to the client.

19 Claims, 10 Drawing Sheets

(56) References Cited

U.S. PATENT DOCUMENTS

| | | | |
|---|---|---|---|
| 2009/0272797 A1* | 11/2009 | Doman | G06F 21/33 |
| | | | 235/380 |
| 2011/0231555 A1 | 9/2011 | Ebrahimi et al. | |
| 2012/0179905 A1* | 7/2012 | Ackerly | G06F 21/6218 |
| | | | 713/155 |
| 2014/0058945 A1* | 2/2014 | Stecher | G06Q 20/02 |
| | | | 705/44 |
| 2015/0074122 A1 | 3/2015 | Appel et al. | |
| 2015/0356523 A1 | 12/2015 | Madden | |
| 2017/0250972 A1 | 8/2017 | Ronda et al. | |
| 2019/0332790 A1* | 10/2019 | Kukehalli Subramanya | |
| | | | H04L 63/10 |

OTHER PUBLICATIONS

Neisse, Ricardo, et al. "Trust management model and architecture for context-aware service platforms."OTM Confederated International Conferences" On the Move to Meaningful Internet Systems". Springer, Berlin, Heidelberg, 2007. (Year: 2007).*

P. Mell et al. , "The NIST Definition of Cloud Computing", National Institute of Standards and Technology, Information Technology Laboratory, Sep. 2011, pp. 1-7.

Marketsandmarkets, "Blockchain Identity Management Market Worth 1,929.9 Million USD by 2023", 2019, Marketsandmarkets Research Private Ltd., marketsandmarkets.com, Press Release, pp. 1-6.

Marketsandmarkets, "Consumer IAM Market Worth $37.79 Billion by 2023", 2019, Marketsandmarkets Research Private Ltd., marketsandmarkets.com, Press Release, pp. 1-6.

* cited by examiner

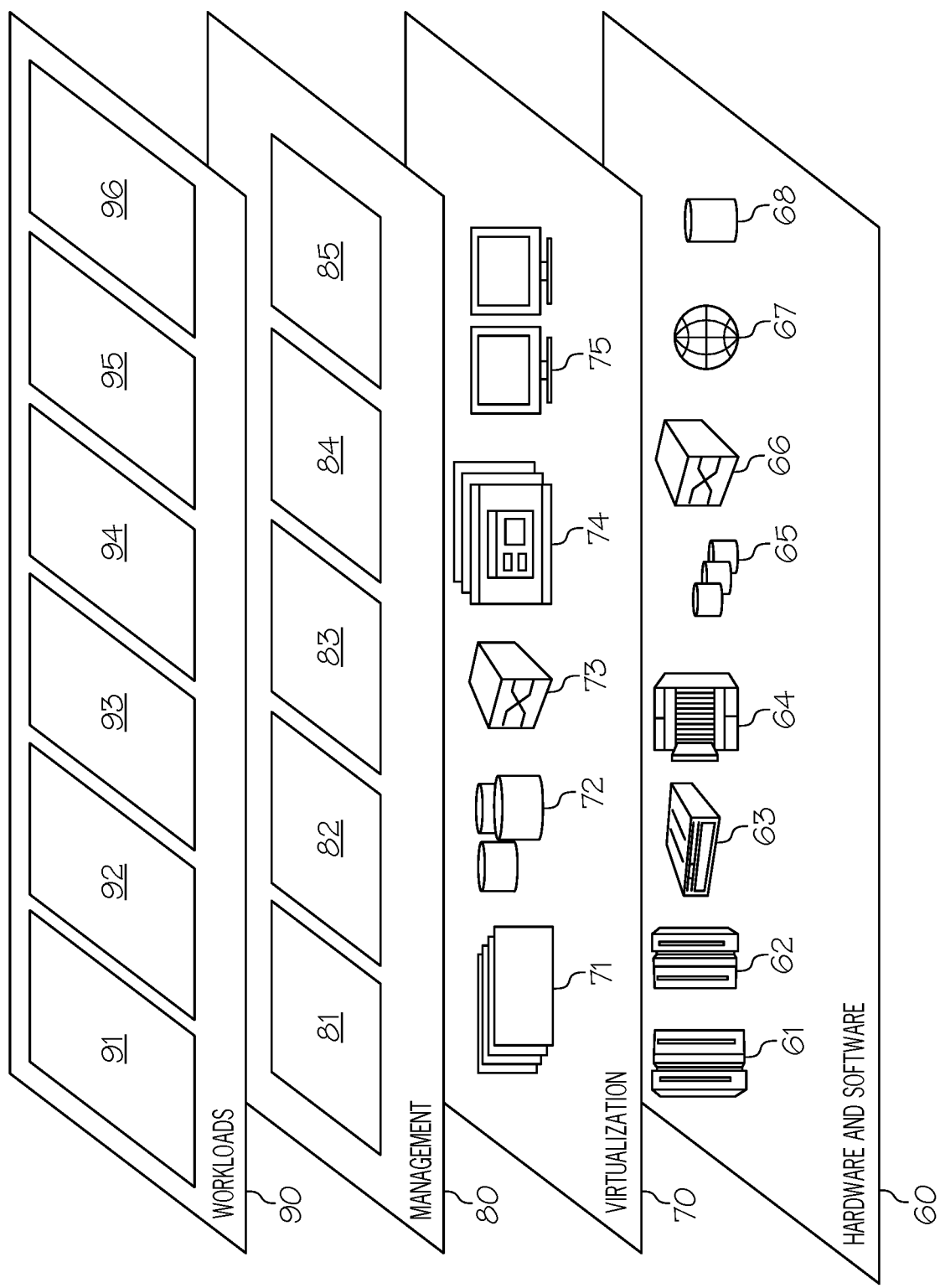

ADAPTIVE IDENTITY BROKER FOR GOVERNANCE OF DECENTRALIZED IDENTITIES ACROSS MULTIPLE HETEROGENEOUS IDENTITY NETWORKS

BACKGROUND

The present invention relates to the field of identity records, and specifically to identity records stored in identity networks. Still more specifically, the present invention relates to training a system to retrieve and evaluate requested identity records that confirm an identity of a particular entity.

SUMMARY

In an embodiment of the present invention, a method provides a network-agnostic identity broker for retrieving and evaluating identity records across heterogeneous identity networks. An identity broker receives a client request from a client to retrieve and evaluate user identity information for confirming an identity of a particular entity. The identity broker utilizes a group membership of the client to select a set of policies for handling the client request, and selects an identity network from multiple heterogeneous identity networks as a selected identity network to which the client request is to be sent. The identity broker sends the client request to the selected identity network, and then receives a response from the selected identity network. The identity broker evaluates the response according to the set of policies, such that the evaluated response conforms with the set of policies, and transmits the evaluated response to the client.

In one or more embodiments, the method(s) described herein are performed by an execution of a computer program product and/or a computer system.

BRIEF DESCRIPTION OF THE DRAWINGS

FIG. 10 depicts abstraction model layers of a cloud computer environment according to an embodiment of the present invention.

DETAILED DESCRIPTION

Figure 1:
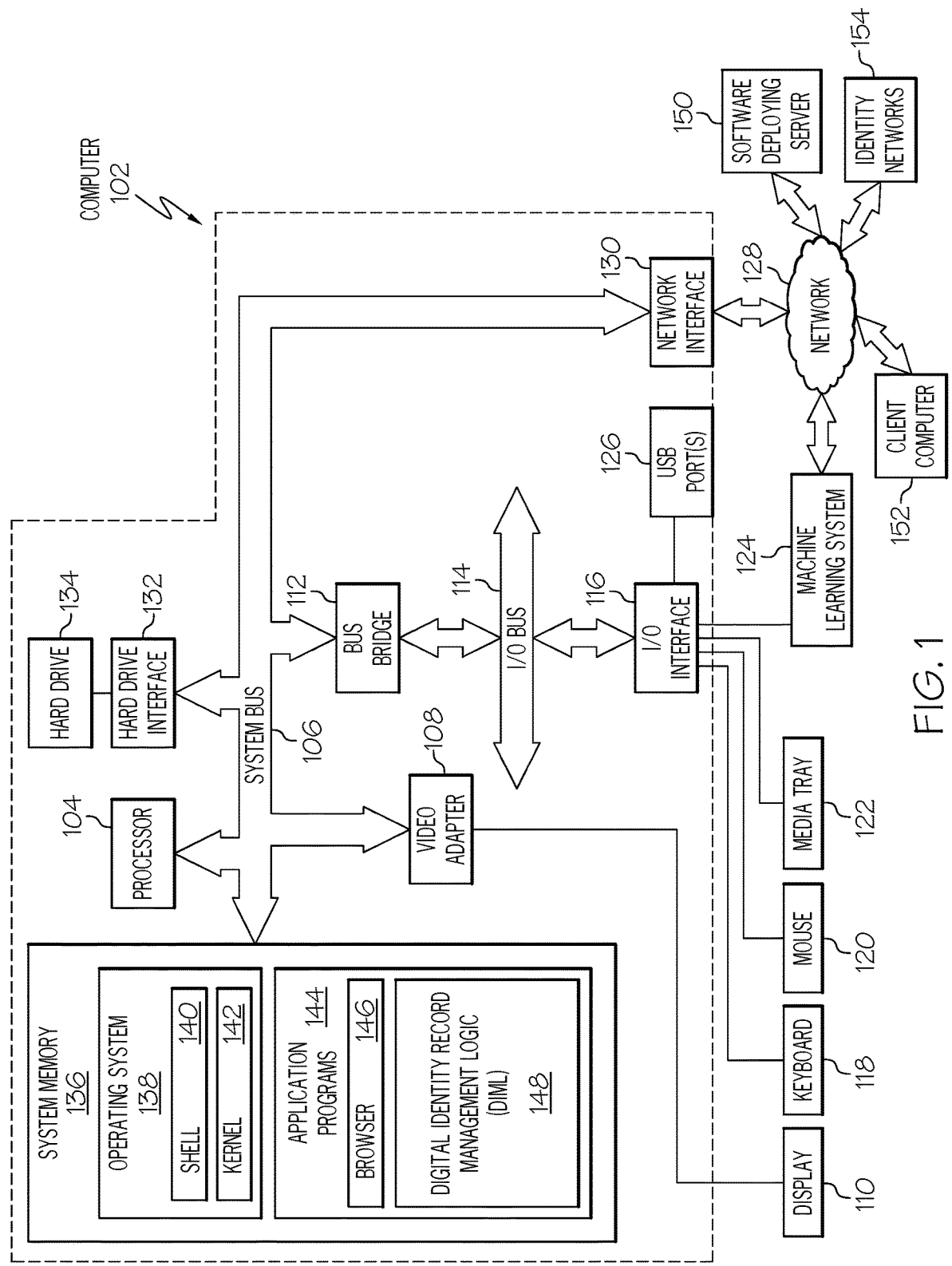
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

An identity broker provides a brokerage service that onboards identity networks for the purpose of collecting decentralized identity profiles and attributes. With this identity profile data, the broker can deliver services to clients including confidence scoring and data transformations driven by regulatory/discretionary policies and identity-owner consent.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by machine learning system 124 and/or software deploying server 150 and/or client computer 152 and/or identity networks 154 shown in FIG. 1, one or more of the identity domains shown in FIG. 2, identity broker 302 and/or client 352 shown in FIG. 3, identity broker 402 and/or identity requester 452 shown in FIG. 4, one or more of the components shown in FIG. 5, one or more of the nodes shown in the deep neural network 624 in FIG. 6, and/or one or more of the systems shown in the reinforcement learning system depicted in FIG. 7.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Digital Identity Record Management Logic (DIRML) 148. DIRML 148 includes code for implementing the processes described below, including those described in FIGS. 2-8. In one embodiment, computer 102 is able to download DIRML 148 from software deploying server 150, including in an on-demand basis, wherein the code in DIRML 148 is not downloaded until needed for execution. Note further that, in one embodiment of the present invention, software deploying server 150 performs all of the functions associated with the present invention (including execution of DIRML 148), thus freeing computer 102 from having to use its own internal computing resources to execute DIRML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server, supercomputer, etc. used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

As used herein, an identity is defined as information that describes a particular entity. An exemplary entity is a person, although the present invention is also applicable for providing an identity of a device, a software program, etc. The terms "identity profile", "identity file" and "identity record" are used interchangeably herein to denote a record of data that includes information that describes a particular entity.

The term "identity network" is defined as a system and/or network that stores, manages, and/or provides identity profiles to a requester.

Figure 2:
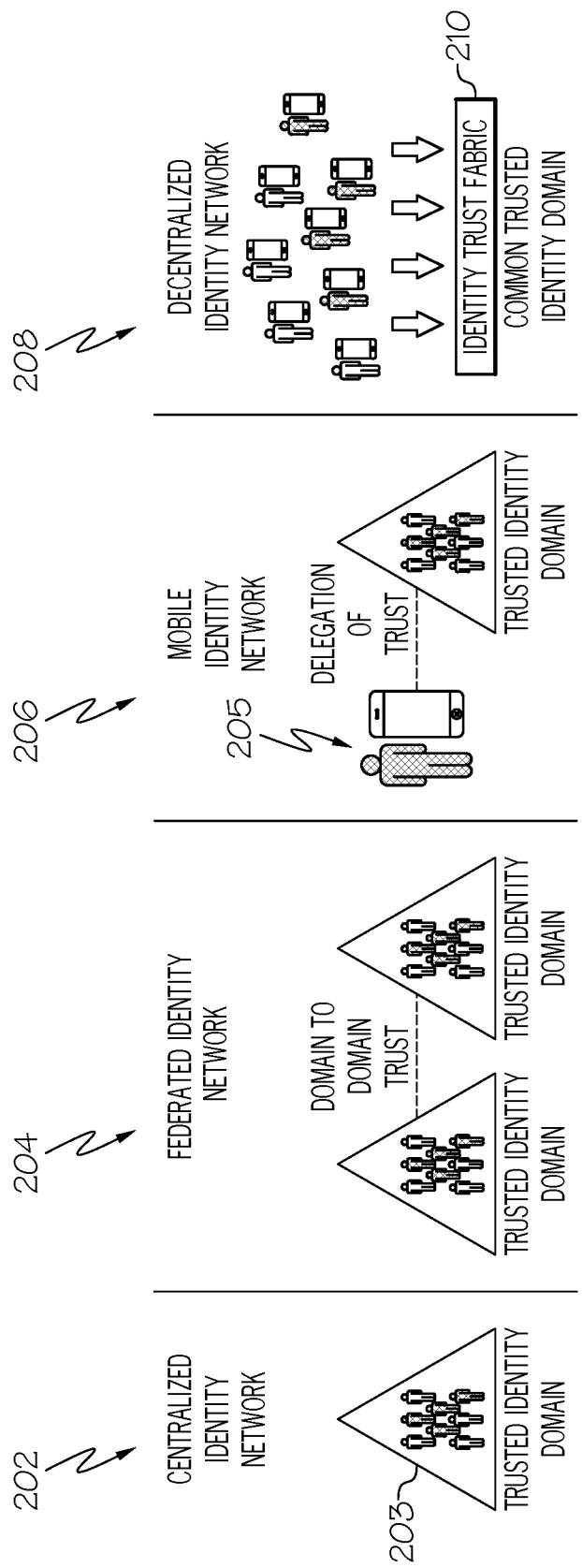
FIG. 2 illustrates an overview of various types of identity networks, including a decentralized identity network as used in one or more embodiments of the present invention.

With reference now to FIG. 2, an overview of one or more identity networks that are utilized in one or more embodiments of the present invention, including but not limited to a decentralized identity network 208, is presented.

As shown in FIG. 2, a centralized identity network 202 is made up of a single trusted identity domain 203 (i.e., a collection of identity profiles).

A federated identity network 204 is a group of multiple trusted identity domains (e.g., multiple trusted identity domains such as the trusted identity domain 203 shown in the centralized identity network 202). These multiple trusted identity domains trust one another to contain identity profiles that accurately represent attributes (name, address, etc.) of identity records for particular entities.

A mobile identity network 206 includes a trusted identity domain that communicates with a mobile device 205 (e.g., a smart phone), such that the trusted identity domain delegates/cedes to the mobile device 205 the decision as to which entities are allowed to retrieve certain identity profiles (e.g., the identity profile of the user of the mobile device 205) from the trusted identity domain. That is, mobile device 205 acts as a controller for access to the trusted identity domain.

A decentralized identity network 208 includes an identity trust fabric 210 that allows multiple mobile devices (e.g., mobile device 205 in the mobile identity network 206), which are communicatively coupled to different trusted identity domains (e.g., trusted identity domain 203, not shown in the decentralized identity network 208), to communicate among one another. That is, the multiple mobile devices, which control access to their corresponding trusted identity domain, communicate via the identity trust fabric 210, thus allowing the different mobile devices to communicate with other mobile devices, such that each mobile device is ultimately able to retrieve identity profiles from other trusted identity domains within the decentralized identity network 208.

Figure 3:
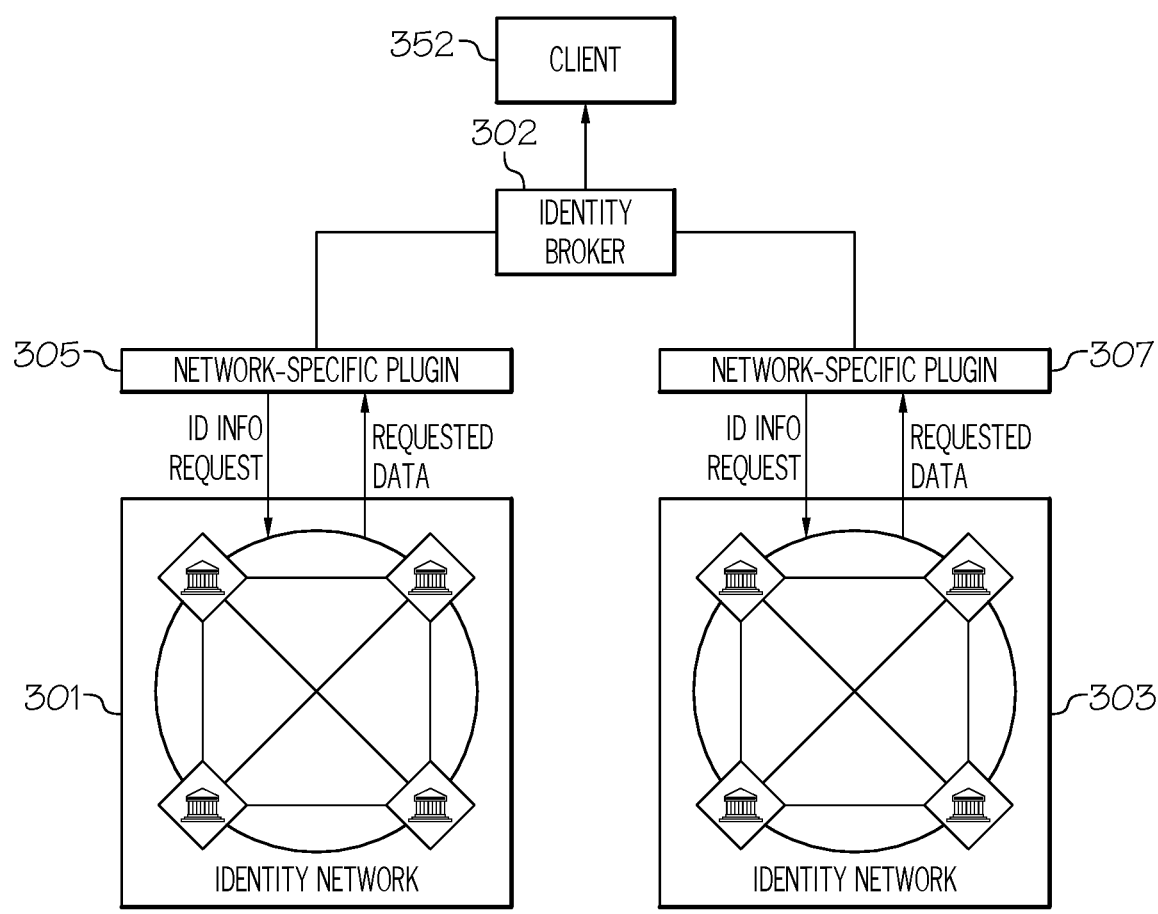
FIG. 3 depicts an identity broker using novel network-specific plugins to retrieve identities from disparate heterogeneous identity networks, in accordance with one or more embodiments of the present invention.

In another embodiment, the decentralized identity network 208 is made up of multiple trusted identity domains, each of which is managed by and coupled to its own management computer, such as the identity broker 302 shown in FIG. 3. Each management computer/identity broker communicates with other management computers/identity brokers via the identity trust fabric 210, such that each management computer/identity broker is ultimately able to retrieve identity profiles from other trusted identity domains within the decentralized identity network 208.

Thus, in the decentralized identity network 208, there are multiple actors (e.g., mobile devices 205) in identity ecosystems (i.e., the identity trust fabric 210), each of which can have different, often conflicting, requirements. For example, the users of the mobile devices 205 want to control who can retrieve their identity profiles, while the enterprises that support the trusted identity domains want visibility of the identity profiles.

A problem with the identity networks shown in FIG. 2, and particularly with the decentralized identity network 208, is heterogeneity in the identity profiles. That is, each identity profile in the different trusted identity domains in the decentralized identity network 208 has different attributes (i.e., fields that describe features of an entity represented by a particular identity profile). These disparate/different types of identity sources make cross-network identity management inefficient and costly. That is, users often have to go through troublesome vetting processes when managing their identities; a manager of one trusted identity domain does not have easy access to attributes of identity profiles in another trusted identity domain (i.e., outside their networks); and the use of multiple networks limits identity correlation between trusted identity domains for fraud detection and other purposes.

In addition, compliance with internal and/or imposed regulations across heterogenetic trusted identity domains is difficult and costly. That is, depending on a geographic location of a particular trusted identity domain, there are many policies for entities to keep in mind while dealing with identity data in order to remain legally compliant. Furthermore, consent management and customer-driven policies are difficult and inefficient to manage.

As such, the present invention presents a system that remains compliant while running in an arbitrary geographic location, and while dealing with arbitrary data. That is, the present invention provides a system to manage identities seamlessly across multiple heterogeneous identity management networks (i.e., identity networks), regardless of where they are located (geographic location) and what policies need to be followed by the identity networks.

With reference then to FIG. 3, a high-level overview of one or more embodiments of the present invention for managing identities seamlessly across multiple heterogeneous identity networks is presented.

As shown in FIG. 3, identity network 301 is managed by a first entity (e.g., a bank), while identity network 303 is managed by a second entity (e.g., an insurance carrier). As such, the bank and the insurance carrier likely have different policies to which they must conform, different formats/protocols that they use to represent identity data, different hierarchies that they use to show relationships between different identities and/or different attributes of a single identity, etc.

A shown in FIG. 3, assume that a user of client 352 (analogous to client computer 152 shown in FIG. 1) wants to verify identity information about a particular individual. In accordance with one or more embodiments of the present invention, rather than the client 352 verifying the individual's information directly, the client 352 requests the identity information for that individual and the verification thereof from an identity broker 302 (analogous to computer 102 shown in FIG. 1), which consults (communicates with) the necessary networks (e.g., identity network 301 and/or identity network 303) to obtain the requested identity record for that individual, as well as what entity verified the information, all while conforming with protocols/policies/requirements of not only the client 352, but also of the identity network 301 and/or the identity network 303.

Furthermore, when the identity broker 302 returns a verification identity record for a particular person to the client 352, a description of what type of identity network provided the verification identity record, and/or the level of trustworthiness of the identity network, is returned to the client 352 by the identity broker 302.

For example, if the identity record came from a single centralized identity network (e.g., centralized identity network 202 shown in FIG. 2), then the identity broker 302 will notify the client 352 that this single identity network alone verified the information in the requested and returned identity profile. As such, the veracity of the information in that returned identity profile has a relatively low level of trustworthiness.

However, if the identity record came from a federation of identity networks (e.g., federation identity network 204 shown in FIG. 2), then the identity broker 302 will notify the client 352 that the information in the requested and returned identity profile has been cross-verified by two trusted identity domains, and thus the returned identity profile has a relatively higher level of trustworthiness.

Furthermore, if the identity record came from a mobile identity network (e.g., mobile identity network 206 shown in FIG. 2), then the identity broker 302 will notify the client 352 that the information in the requested and returned identity profile has essentially been verified by a single trusted identity domain, and thus the returned identity profile has essentially the same level of trustworthiness as identity profiles returned by a centralized identity network.

However, if the identity record came from a decentralized identity network (e.g., decentralized identity network 208 shown in FIG. 2), then the identity broker 302 will notify the client 352 that the information in the requested and returned identity profile has been cross-verified via an identity trust fabric 210, which allows multiple mobile identity networks to cross-verify the returned identity record, and thus the returned identity profile has an even higher level of trustworthiness than that provided by a federated identity network.

However, both the federated identity network 204 and the decentralized identity network 208 shown in FIG. 2 come with the problem of heterogeneity, in which their records are often disparate in their formats, organization, etc., due to the multiplicity of trusted identity domains used to provide and/or cross-verify identity records.

In order to address this problem of heterogeneity, the present invention uses network plugins, which facilitate a network-agnostic request by having pluggable communication layers specific to each identity network. That is, the identity broker 302 requests information about a particular person. However, the identity broker 302 does not need (or want) to know about what format/organization is used by the different identity networks. As such, exemplary network-specific plugin 305 (for identity network 301, which is analogous to one of the identity network(s) 154 shown in FIG. 1) and network-specific plugin 307 (for identity network 303, which is also analogous to one of the identity network(s) 154 shown in FIG. 1) convert the identity record request into a format that is understood by their respective identity networks 301/303.

Figure 4:
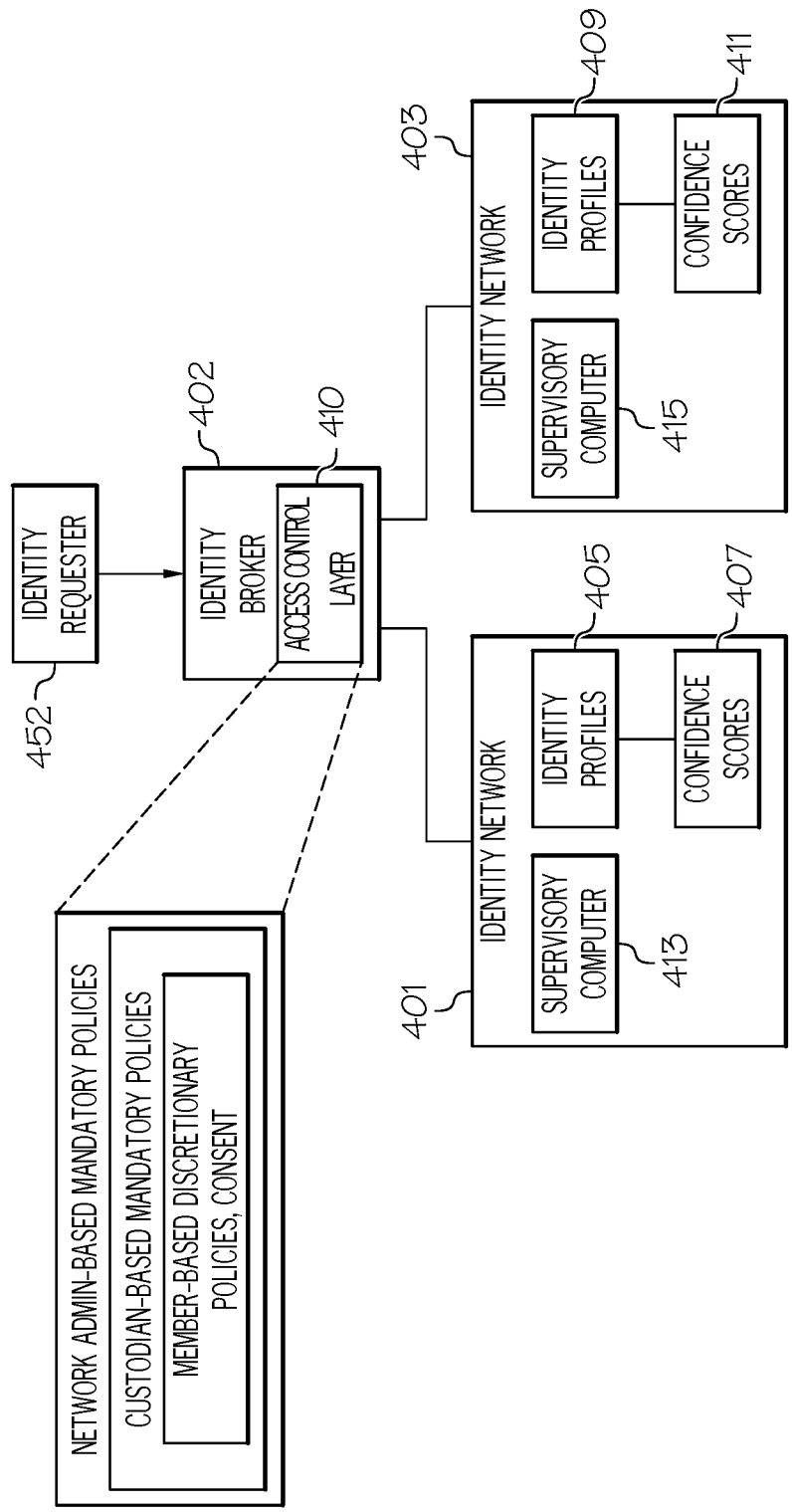
FIG. 4 illustrates detail of an access control layer used in the identity broker depicted in FIG. 3.

For example, and with reference now to FIG. 4, assume that an identity requester 452 (analogous to client 352 shown in FIG. 3) requests from identity broker 402 (analogous to identity broker 302 shown in FIG. 3) identity information about a particular person. Since identity broker 402 is in communication with identity network 401 (analogous to identity network 301 shown in FIG. 3) and identity network 403 (analogous to identity network 303 shown in FIG. 3), it is able to search through identity profiles 405 from identity network 401 and identity profiles 409 from identity network 403, searching for one or more identity profiles for that particular person.

However, an access control layer 410 contains policies that the identity broker 402 must follow. These policies are network based, custodian based, and member based.

Network based policies (depicted in FIG. 4 as "network admin-based mandatory policies) are mandatory policies that the identity networks (e.g., identity network 401 and/or identity network 403) are required to follow. For example, assume that identity network 401 is a database of patient identities. As such, release of these patient identities is regulated by mandatory regulations that limit which entities (or types of entities) are allowed to receive the patient identities. If identity network 403 provides employment records of various persons, then release of these records can be limited to only enterprises specifically named by the person whose employment records are being requested.

Custodian based policies (depicted in FIG. 4 as "custodian-based mandatory policies") are mandatory policies that the identity broker 402 is required to follow. For example, assume that identity broker 402 is authorized to retrieve identity records related to a particular person's employment history, but not related to that particular person's health history. Assuming still that identity network 401 is a database of patient identities, and that identity network 403 is a database of employment-related personal histories, then identity broker 402 is able to search through identity network 403, but not identity network 401, looking for an identity record for that particular person.

Member based policies (depicted in FIG. 4 as "member-based discretionary policies, consent") are policies that the identity requester 452, at its discretion, has decided to follow. For example, even if there are no mandatory network based policies or custodian based policies that prohibit the identity requester 452 from requesting an identity record that includes the phone number of a particular person, the identity requester 452 can have an internal policy against obtaining such information, and thus directs the identity broker 402 to either 1) ignore any identity record that contains this information, or 2) redact the telephone number from any returned identity profile.

In an embodiment of the present invention, the identity networks (e.g., identity network 401 and/or identity network 403) includes and/or generates confidence scores for each (or all) of the identity profiles contained therein. These confidence scores are represented as confidence scores 407 for the identity profiles 405 in identity network 401, and as confidence scores 411 for identity profiles 409 in identity network 403. These confidence scores represent the confidence level of the accuracy of all of the identity profiles within a particular identity network, and/or are for each individual identity profile within the identity network.

For example, assume that the identity network 401 is a decentralized identity network (e.g., decentralized identity network 208 shown in FIG. 2). As such, for reasons discussed above, all of the identity profiles 405 are deemed (by a supervisory system, such as supervisory computer 413, for the identity network 401 and/or by identity broker 402) to have a high confidence that these identity profiles are accurate.

Furthermore, the supervisory computer 413 and/or the identity broker 402 is also able to evaluate a particular identity profile from the identity profiles 405. For example, if a particular identity profile shows the age of a particular person to be 275 years old, then the confidence in this particular identity profile is lowered, since the data in that particular identity profile is apparently corrupted, fraudulent, and/or in error.

In addition, assume that the identity network 403 is a centralized identity network (e.g., centralized identity network 202 shown in FIG. 2). As such, for reasons discussed above, all of the identity profiles 409 are deemed (by a supervisory system, such as supervisory computer 415, for the identity network 403 and/or by identity broker 402) to have a low confidence that these identity profiles are accurate.

Furthermore, the supervisory computer 415 and/or the identity broker 402 is also able to evaluate a particular identity profile from the identity profiles 409. Again, if a particular identity profile shows the age of a particular person to be 275 years old, then the confidence in this particular identity profile is lowered even further, since the data in that particular identity profile is apparently corrupted, fraudulent, and/or in error.

Figure 5:
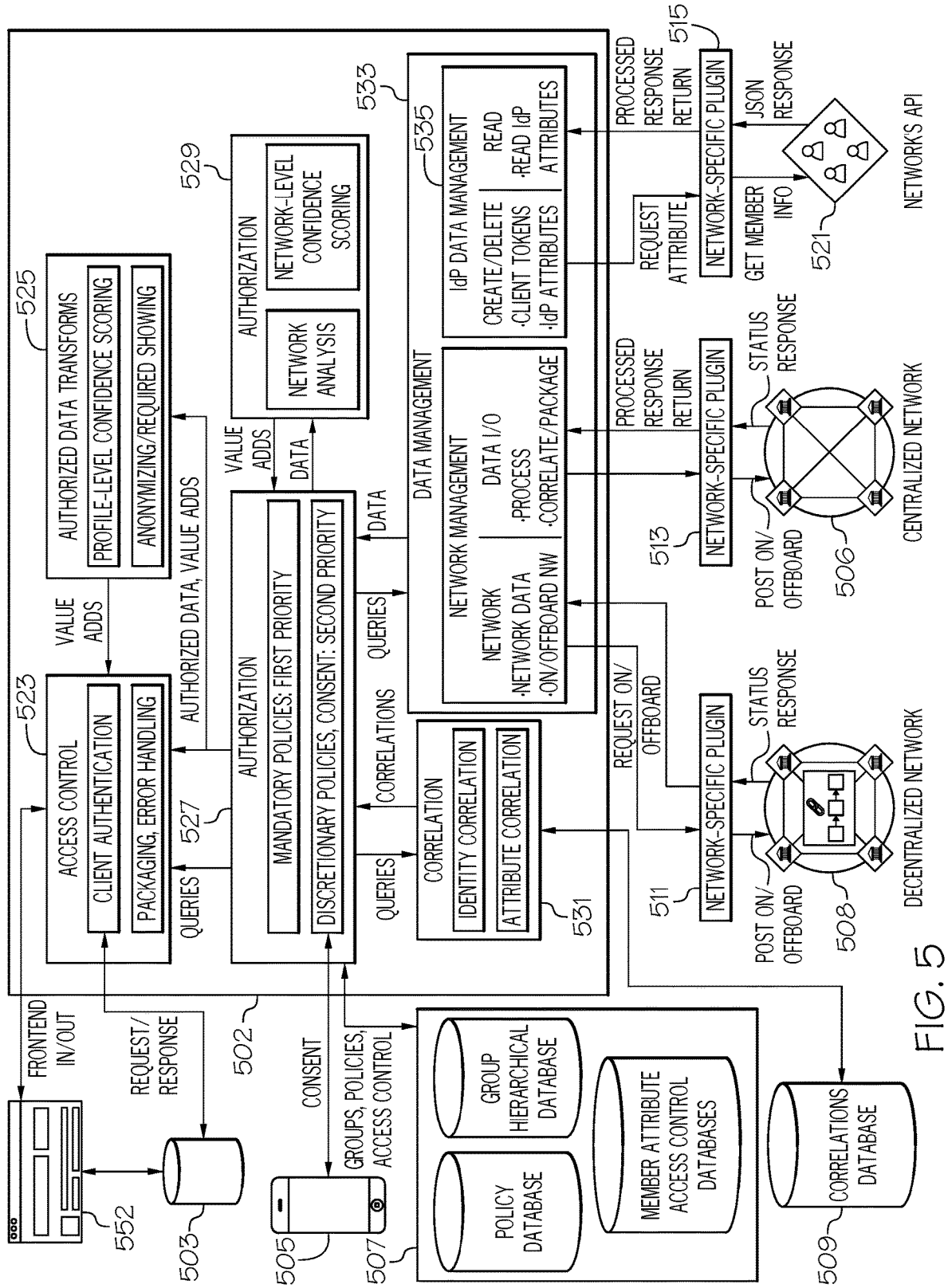
FIG. 5 depicts the identity broker(s) shown in FIG. 3 and/or FIG. 4 interfacing with various devices and networks, in accordance with one or more embodiments of the present invention.

With reference now to FIG. 5, an overview of systems and devices that the identity broker 502 communicates with (analogous to identity broker 402 shown in FIG. 4) is presented.

As shown in FIG. 5, the identity broker 502 initially communicates with a client 552 (analogous to identity requester 352 shown in FIG. 3), via a graphical user interface (GUI) (e.g., on a display 110 shown in FIG. 1) used by a user of the client 552, which requests an identity record of a particular person. This communication is enabled by an access control 523 within the identity broker 502.

As shown in FIG. 5, the access control 523 authenticates the client 552, and handles packaging and error handling of communications with the client 552. Furthermore, the services provided by the access control 523 also include the value adds provided by authorized data transforms 525, which is logic (i.e., a combination of software and hardware within the identity broker 502) that provides multiple functions, including profile-level confidence scoring, anonymizing/required showing decisions, and data transformations.

Figure 6:
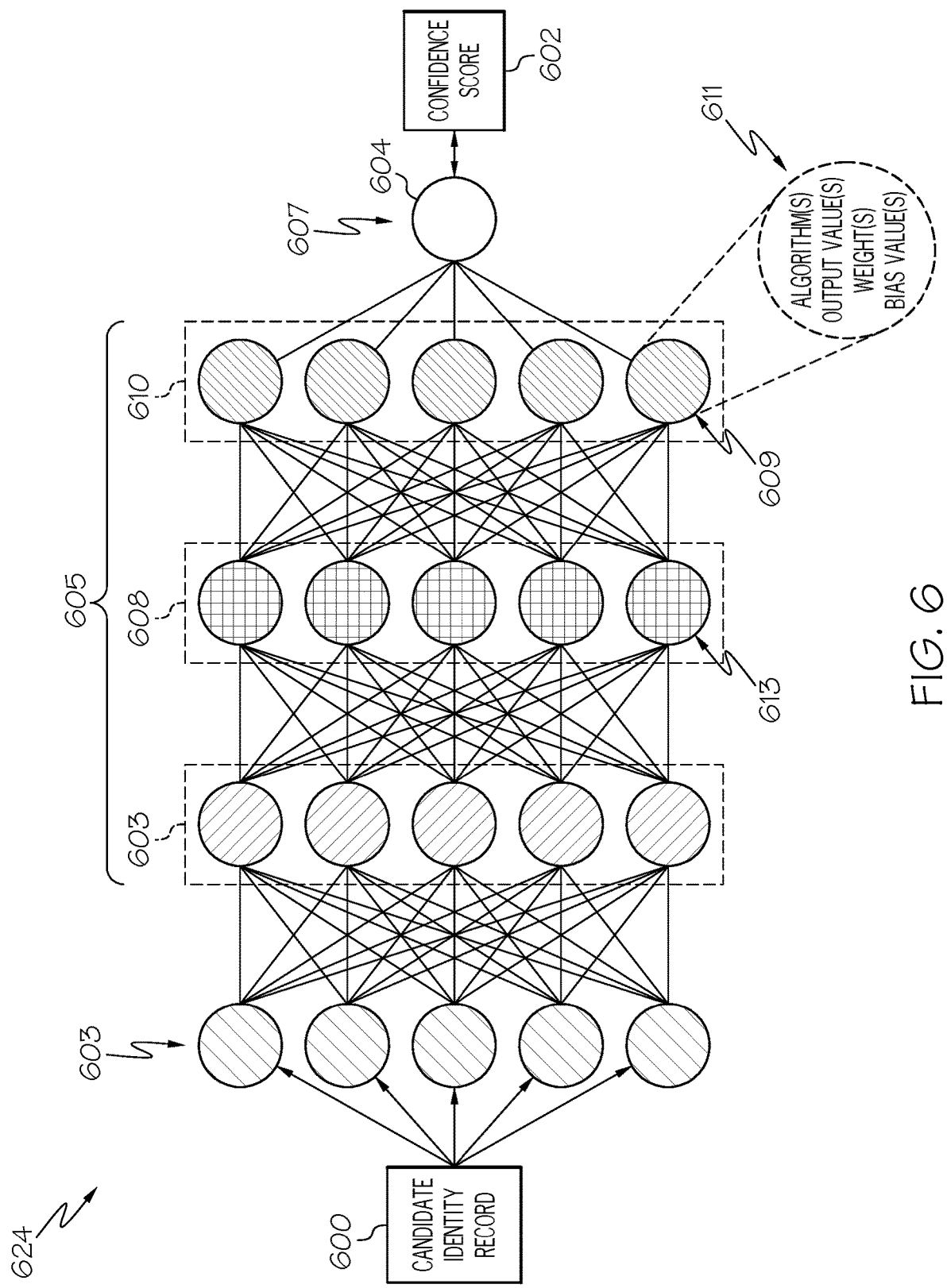
FIG. 6 illustrates an exemplary deep neural network that is trained to produce confidence scores for an identity record from a selected identity network in accordance with one or more embodiments of the present invention.
Figure 7:
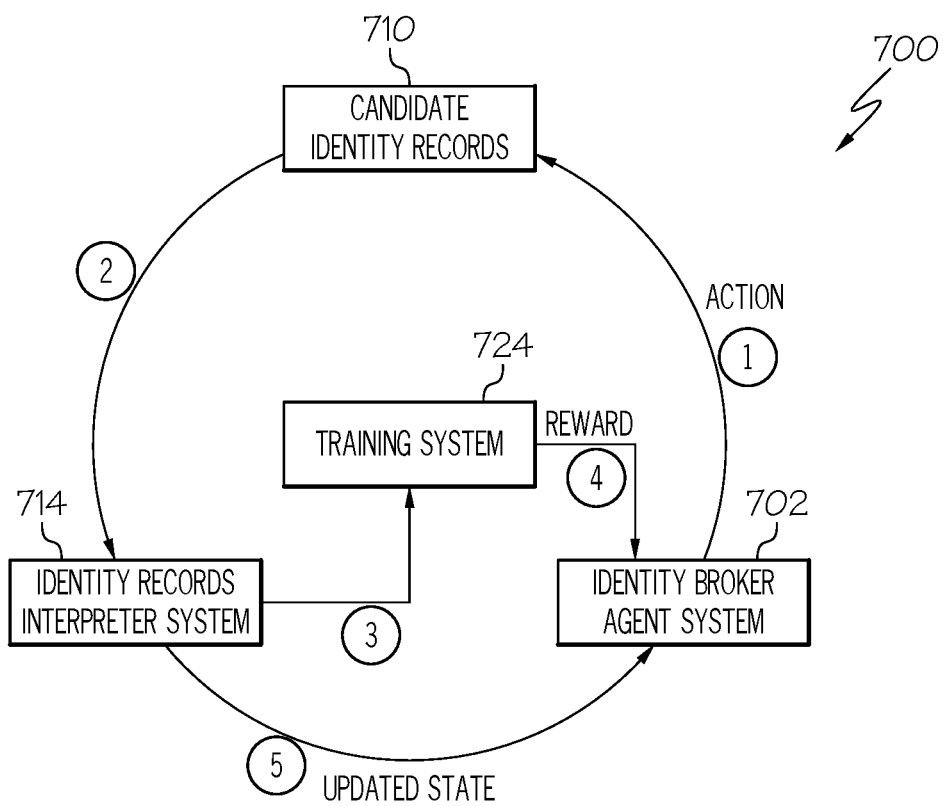
FIG. 7 depicts a reinforcement learning system used to produce confidence scores for an identity record from a selected identity network in accordance with one or more embodiments of the present invention.

The profile-level confidence scoring scores how confident the identity broker 502 is regarding whether the identity profile being requested is in fact the identity profile that is retrieved by the identity broker, as well as how confident the identity broker 502 is that the information in the retrieved identity profile is accurate. This confidence is reflected as confidence scores (e.g., confidence scores 407 and confidence scores 411 shown in FIG. 4). FIG. 6 and FIG. 7 (discussed below) detail exemplary systems for generating such confidence scores.

The anonymizing/required showing decisions determine what features of an identity record are hidden (anonymizing) and which are displayed (required showing) to the requester. That is, assume that the client 552 has requested the identity of "Person A" be verified. Assume further that the identity record that the identity broker 502 retrieves (e.g., from decentralized network 508) includes the social security number and the address ("Address X") of "Person A". Using these two attributes, the authorized data transforms 525 will confirm the identity of "Person A" based on that retrieved identity record. As such, the identity broker 502 will send a message to client 552 stating that the identity of "Person A" has been confirmed, based on "Person A" being confirmed based on "Person A" living at "Address X". Thus, "Address X" is shown to the client 552 (required showing). However, the social security number of "Person A", even though used by the identity broker 502 to confirm the identity of "Person A", is not returned to the client 552 (anonymized).

Also part of identity broker 502 is logic for authorization 527. Authorization 527 retrieves from databases 507 policies at the network, custodian, and member level, as discussed in FIG. 4. As shown in FIG. 4, some of these policies are mandatory (e.g., network and custodian policies), and thus are given first priority when determining how to return identity profiles. Other policies are discretionary (e.g., member-based discretionary policies and consent), and thus are given second priority when determining how to return identity profiles.

The profile data management 529 shown in FIG. 5 is logic for analyzing the features and state of identity networks (i.e., a network analysis that describes the type of identity networks used, and a confidence level for the identity records from those identity networks being accurate). This network analysis and network-level confidence scoring utilizes the group hierarchical database from databases 507.

The network analysis shown in profile data management 529 utilizes a group hierarchical database that contains a description of a hierarchy of identity networks to be searched. For example, assume that the group hierarchical database shown in databases 507 includes a group hierarchical policy that, for a particular requester 552, requires the identity broker 502 to first search decentralized networks (e.g., decentralized network 508, analogous to decentralized identity network 208 shown in FIG. 2) for record(s) for a particular person, and then (e.g., if unsuccessful in finding a record for that particular person in the decentralized network) to search a centralized network (e.g., centralized network 506, analogous to centralized identity network 202 shown in FIG. 2) for an identity record for that particular person.

The network-level confidence scoring shown in profile data management 529 describes how confident the identity broker 502 is that a particular identity network can provide accurate identity records, as determined by historical usage and metadata descriptions of various identity networks. Determination of the confidence level is derived by a neural network (see FIG. 6) and/or a reinforcement learning system (see FIG. 7) in one or more embodiments of the present invention.

Also depicted within databases 507 is a member attribute access control database, which contains access control policies at the member level, as discussed in FIG. 4.

Also shown within identity broker 502 is correlation logic 531, which correlates identities and attributes of entities whose identities are being confirmed by the identity broker 502 using a correlations database 509. That is, assume that identity broker 502 has been asked to confirm the identity of "Person A". Assume further that the identity broker 502 has elected to use decentralized network 508 to obtain an identity record for "Person A", which will confirm the identity of "Person A" as described by client 552. However, the format that client 552 uses to describe "Person A" and the format the decentralized network 508 uses to describe "Person A" are often different, due to different attribute fields, formatting, etc. As such, correlations database 509 provides a table to correlate the identity representing "Person A" as described by the client 552 to how "Person A" is described in the decentralized network 508, thus enabling the identity broker to confirm the identity of "Person A" as described by the client.

Also within identity broker 502 is data management logic 533, which communicates with network-specific plugin 511 (for decentralized network 508), network-specific plugin 513 (for centralized network 506), and/or network-specific plugin 515 (for network's application programming interface 521).

That is, network-specific plugin 511 provides an interface between identity broker 502 that allows identity broker 502 to communicate with the decentralized network 508 using protocols, formats, etc. that are understood by the decentralized network 508.

Likewise, network-specific plugin 513 provides an interface between identity broker 502 that allows identity broker 502 to communicate with the centralized network 506 using protocols, formats, etc. that are understood by the centralized network 506.

Similarly, the network-specific plugin 515 allows the identity broker 502 to communicate with an application programming interface (API) used by a specific identity network, such that tokens and identity profile attributes created by the identity profile data management logic 535 can be used in a JavaScript Object Notation (JSON) interrogation (i.e., using human-readable text to transmit data objects having attribute—value pairs and array data types) of the network's API 521.

Thus, FIG. 5 depicts an identity broker 502 with a modular design that allows for dynamic, flexible centralized and decentralized identity network interfacing and hierarchical, comprehensive policy compliance.

This dynamic, flexible identity network interfacing is achieved by incorporating network plugins, modules that are part of the broker but operate independent of each other and are specifically designed for a single network or set of similar networks.

Hierarchical, adaptive, comprehensive policy compliance is achieved by associating each attribute in a network with a list of access control policies unique to it.

At the discretionary tier, the individual who owns the attribute may provide or revoke consent for different operations on it, as well as provide additional subject-action discretionary policies on individual attributes and for their overall profile.

At the custodian tier, custodians who verify or own attributes may add a mix of mandatory and discretionary policies, depending on the permissions they have.

At the network tier, network admins may apply mandatory policies to individual policies or policies grouped by type, such as the General Data Protection Regulation (GDPR) (a European Union regulation addressing data protection and privacy for individuals within the EU).

Any attribute-requesting entity is associated with a set of groups it is part of, and the broker filters or modifies data based on the list of applicable policies.

Eventually, using the process/method described herein, the identity broker 502 returns the requested verification identity record to a database 503, which is accessible by the client 552.

In an embodiment of the present invention, the identity broker 502 receives, via communication device 505, consent from the particular person to allow the identity broker 502 to search for and/or return the identity record for that particular person to the client 552.

With reference now to FIG. 6, an exemplary neural network as used to establish a confidence score that a particular identity record accurate describes an entity for whom identity confirmation is being requested by a client is presented.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Deep Neural Network (DNN), electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

With reference now to FIG. 6, a Deep Neural Network (DNN) 624 (analogous to machine learning system 124 shown in FIG. 1) used to evaluate candidate identity records to respond to a client's request to verify the identity of a particular entity in one or more embodiments of the present invention is presented. For example, candidate identity record 600 is data that describes a particular candidate identity record (e.g., one of the identity profiles 405 or identity profiles 409 shown in FIG. 4). In one or more embodiments of the present invention, the candidate identity record 600 includes the standard variables for a request of an identity, the overall trustworthiness of an identity network from which an identity record is retrieved, and the validity of the identity records held in that identity network. DNN 624 is a neural network that interprets these variables/features in order to determine whether or not the candidate identity record accurately validates the identity presented by client 352 shown in FIG. 3.

The electronic neurons (also referred to herein simply as "neurons" or "nodes") in DNN 624 are arranged in layers, known as an input layer 603, hidden layers 605, and an output layer 607. The input layer 603 includes neurons/nodes that take input data, and send it to a series of hidden layers of neurons (e.g., hidden layers 605), in which neurons from one layer in the hidden layers are interconnected with all neurons in a next layer in the hidden layers 605. The final layer in the hidden layers 605 then outputs a computational result to the output layer 607, which is often a single node for holding vector information. In an embodiment of the present invention, each neuron in the output layer 607 is associated with a particular label 602 for a confidence score, as shown in FIG. 6.

As just mentioned, each node in the depicted DNN 624 represents an electronic neuron, such as the depicted neuron 609. As shown in block 611, each neuron (including neuron 609) functionally includes at least four elements: a mathematical function, an output value, a weight, and a bias value.

The mathematical function is a mathematic formula for processing data from one or more upstream neurons. For example, assume that one or more of the neurons depicted in the middle hidden layers 605 send data values to neuron 609. Neuron 609 then processes these data values by executing the mathematical function shown in block 611, in order to create one or more output values, which are then sent to another neuron, such as another neuron within the hidden layers 605 or a neuron in the output layer 607. Each neuron also has a weight that is specific for that neuron and/or for other connected neurons. Furthermore, the output value(s) are added to bias value(s), which increase or decrease the output value, allowing the DNN 624 to be further "fine-tuned".

For example, assume that neuron 613 is sending the results of its analysis of a piece of data to neuron 609. Neuron 609 has a first weight that defines how important data coming specifically from neuron 613 is. If the data is important, then data coming from neuron 613 is weighted heavily, and/or increased by the bias value, thus causing the mathematical function (s) within neuron 609 to generate a higher output, which will have a heavier impact on neurons in the output layer 607. Similarly, if neuron 613 has been determined to be significant to the operations of neuron 609, then the weight in neuron 613 will be increased, such that neuron 609 receives a higher value for the output of the mathematical function in the neuron 613. Alternatively, the output of neuron 609 can be minimized by decreasing the weight and/or bias used to affect the output of neuron 609. These weights/biases are adjustable for one, some, or all of the neurons in the DNN 624, such that a reliable output will result from output layer 607. In one or more embodiments of the present invention, finding the values of weights and bias values is done automatically by training the neural network. In one or more embodiments of the present invention, manual adjustments are applied to tune the hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 607 matches expectations. For example, assume that input layer 603 receives inputs that describe a particular person. If DNN 624 has been properly trained (by adjusting the mathematical function (s), output value(s), weight(s), and biases in one or more of the electronic neurons within DNN 624) to output a vector/value to the output layer 607, indicating that the neuron 604 that is associated with the label 602, which describes the confidence score that the candidate identity record 600 accurately describes the particular person, assuming that the input layer 603 and the hidden layers 605 have been properly trained to evaluate candidate identity records.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 607 improves (e.g., accurately describes the entity based on the retrieved identity profile).

As shown in FIG. 6, various layers of neurons are shaded differently, indicating that they are specifically trained for different aspects of a candidate identity record in an embodiment of the present invention. For example, and as shown in FIG. 6, the input layer 603 is specifically for all information about an identity profile.

Thus, in this embodiment, assume that within the hidden layers 605 are: layer 606, which contains neurons that are designed to evaluate the validity of the client who has requested the person's identity to be verified (i.e., whether the client is authorized to make such a request); layer 608, which contains neurons that are designed to evaluate the overall trustworthiness of the candidate identity record to be valid; and layer 610, which contains neurons that are designed to evaluate standard variables that are associated with criteria that describe a person in the identity profile.

Thus, in the embodiment of DNN 624 shown in FIG. 6, layer 606 (i.e., that evaluates the validity of the client who has requested the person's identity to be verified) controls the inputs to the neurons in layer 608 (which are devoted to evaluating the overall trustworthiness of the candidate identity record to be valid). The outputs of neurons from layer 608 then control the inputs to the neurons in layer 610

(which are designed to evaluate standard variables that are associated with criteria that describe a person in the identity profile).

As such, in the DNN 624 depicted in FIG. 6, the overall trustworthiness of the requesting client has the greatest impact in determining whether the candidate identity record/profile is accurate, and the overall trustworthiness of the candidate identity record and the standard variables that are associated with criteria that describe a person in the identity profile have decreasing levels of impact on whether the candidate identity record is accurate. That is, if the requesting client is not valid/authorized (as determined by layer 606), then the overall trustworthiness of the candidate identity record must be very high, in order to overcome the low values that are output from layer 606. Similarly, if the overall trustworthiness of the candidate identity record is highly questionable, then the validity of the standard variables that are associated with criteria that describe a person in the identity profile must be very high, in order to justify the use of the candidate identity record.

In other embodiments of the present invention, layer 606, layer 608, and layer 610 are repositioned relative to one another, such that the elements evaluated therein are provided with different impacts than that just described.

While FIG. 6 depicts an embodiment of the present invention in which a DNN is used to establish the confidence level of a candidate identity record, other types of reinforcement learning are utilized in other embodiments of the present invention. That is, a DNN is trained using known training data, labels, etc. in a supervised manner in order to train the machine learning system 124 shown in FIG. 1. Alternatively, unsupervised reinforcement learning, such as Q-learning, can be utilized in one or more embodiments of the present invention.

Unsupervised reinforcement learning is an artificial intelligence that uses trial and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforcement learning system uses a Q-learning algorithm, which updates Q values of rewards when the actor/robot performs a certain action (swinging a bat) in a certain state (when the pitched ball is approaching the robot).

In an embodiment of the present invention, this type of reinforcement learning is used to evaluate identity records for confirming an identity of a particular person/entity.

With reference then to FIG. 7, an exemplary overview of an unsupervised learning environment 700, which evaluates different identity profiles for validating a particular identity is presented.

As shown in FIG. 7, the identity broker agent system 702, analogous to identity broker 302 shown in FIG. 3, performs an action, as indicated by step 1. Examples of this action include, but are not limited to, retrieving a candidate identity record from candidate identity records 710 (e.g., from identity network 301 and/or identity network 303 shown in FIG. 3) based on a certain profile/parameter set by the client 352 shown in FIG. 3, modifying a particular identity record based on parameters set by client 352 in FIG. 3, etc.

Based on what the identity broker agent system 702 is "looking for" in an identity record (step 1), that first/particular candidate identity record will send the identity records interpreter system 714 (e.g., a supervisory computer that oversees the operations of the identity broker 302, and/or the identity broker 302 itself) details of the attributes found in the retrieved first candidate identity record from candidate identity records 710, as shown in step 2.

The identity records interpreter system 714 then sends this information from the candidate identity record from candidate identity records 710 to a training system 724, which in an embodiment of the present invention is a simple binary "yes/no" system used in unsupervised training. That is, a training system 724 does not use known training data, but rather uses trial and error until an optimal solution is found using rewards.

Thus, the identity records interpreter system 714 sends the description of the attributes of the first/particular candidate identity record (from candidate identity records 710) from a selected identity network to the training system 724 in step 3. The training system 724 determines how closely these attributes match what the identity broker agent system 702 is looking for in an identity record, and sends this information in the form of a "reward" (in which close matches receive positive rewards and poor matches receive negative rewards) to the identity broker agent system 702, as shown in step 4.

Furthermore, the updated state of the particular candidate identity record from candidate identity records 710 (e.g., the fact that it has been sent to the training system 724 for evaluation) is sent to the identity broker agent system 702, as indicated by step 5.

Once all of the evaluation and information sharing steps 1-5 have been performed for a first candidate identity record, steps 1-5 are repeated for each of the rest of the candidate identity records until all of the candidate identity records 710 have been evaluated, or else until some predetermined quantity of the candidate identity records 710 have been evaluated.

In an embodiment of the present invention, the identity broker agent system 702 includes a reinforcement learning system (e.g., similar to training system 724), which allows the identity broker agent system 702 to compare the different identity records from the candidate identity records 710, thus training the reinforcement learning system used by the identity broker agent system 702 and/or the identity records interpreter system 714 to recognize an optimal identity record that meets the requirements of the identity broker agent system 702 and the requesting client.

Figure 8:
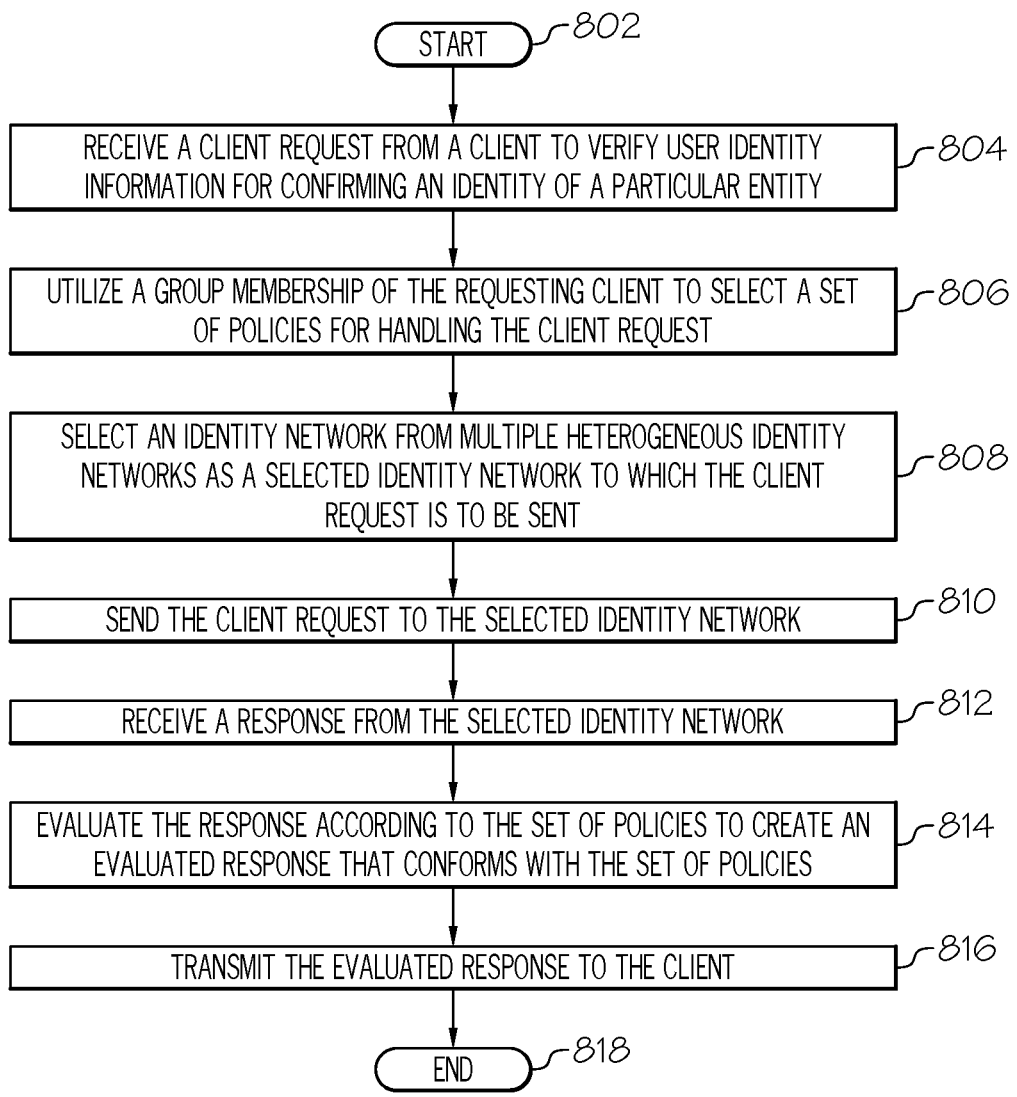
FIG. 8 is a high-level flow chart of one or more steps performed in accordance with one or more embodiments of the present invention.

With reference now to FIG. 8, a high-level flow chart of one or more elements of an exemplary method performed by the present invention is presented.

After initiator block 802, an identity broker (e.g., identity broker 302 shown in FIG. 3) receive a client request from a client (e.g., client 352) to retrieve and evaluate user identity information in order to confirm an identity of a particular entity, as described in block 804. For example, client 352 could send the identity broker 302 a request such as "Person A has shown me a driver's license with number xxxx. Is this really Person A?" In order to verify the identity of Person A, identity broker 302 will have to mine a database (federated, centralized, decentralized, etc.) of drivers' licenses in order to confirm the identity of Person A. However, one or more embodiments of the present invention take additional steps to ensure that not only are the appropriate identity records being retrieved, but this retrieval is being performed in conformance with a set of policies, in order to ensure that the verification identity records are being retrieved from appropriate (e.g., authorized, accurate, etc.) identity networks, etc. Examples of the set of policies are discussed above with regard to the set of policies utilized by the access control layer 410 shown in FIG. 4.

Thus, as described in block 806 the identity broker utilizes a group membership of the requesting client to select a set of policies for handling the client request. That is, assume that the requesting client is a bank. As such, the requesting client is a member of a group (cohort) of banks, which have certain policies for requesting an identity to be validated. As shown in FIG. 4 and in accordance with one or more embodiments of the present invention, the set of policies includes a network-level (network admin-based) mandatory policy, a custodian-level (custodian based) mandatory policy, and a member-level (member-based) discretionary policy.

As described in block 808, the identity broker selects an identity network from multiple heterogeneous identity networks (e.g., identity network 401 or identity network 403 shown in FIG. 3) as a selected identity network to which the client request is to be sent. The term "heterogeneous is used to describe these different identity networks as using different protocols, different identity record attributes, different types of identity domains (see FIG. 2), etc.

As described in block 810, the identity broker sends the client request to the selected identity network, and then receives a response from the selected identity network (block 812).

As described in block 814, the identity broker evaluates the response according to the set of policies to create an evaluated response, such that the evaluated response conforms with the set of policies. That is, the evaluated response conforms to policies such as the mandatory and discretionary policies discussed above with regard to the policies utilized by the access control layer 410 in FIG. 4, and/or the policies utilized in the authorization 527 block depicted in FIG. 5.

As described in block 816, the identity broker then transmits the evaluated response to the client.

The flow-chart ends at terminator block 818.

Thus, the present invention improves the operation of a computer system by returning only identity records that comply with the set of policies, thus improving the security of the computer system, and reducing bandwidth between the identity broker and the client by returning only those identity records that comply with this set of policies (as described herein).

In an embodiment of the present invention, the identity broker interfaces with the selected identity network via a network plugin that conforms with the set of policies, and the network plugin is specifically for use with the selected identity network. (See FIG. 5.)

In an embodiment of the present invention, the network plugin is a module within the identity broker. That is, rather than being external to the identity broker as shown in FIG. 5, in this embodiment the network plugins (i.e., elements 511, 513, 515) are internal to the identity broker 502.

In an embodiment of the present invention, the selected identity network is registered as a new identity network for use by the identity broker. For example, once identity network 301 or identity network 303 is selected to be used by the identity broker 302 in FIG. 3, then that network is registered as being authorized for use by the identity broker 302 to handle requests from client 352.

In an embodiment of the present invention, a machine learning system is trained to generate a confidence score for the evaluated response, as described above in FIG. 6 and/or FIG. 7. Thereafter, the identity broker transmits the confidence score for the evaluated response to the client.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
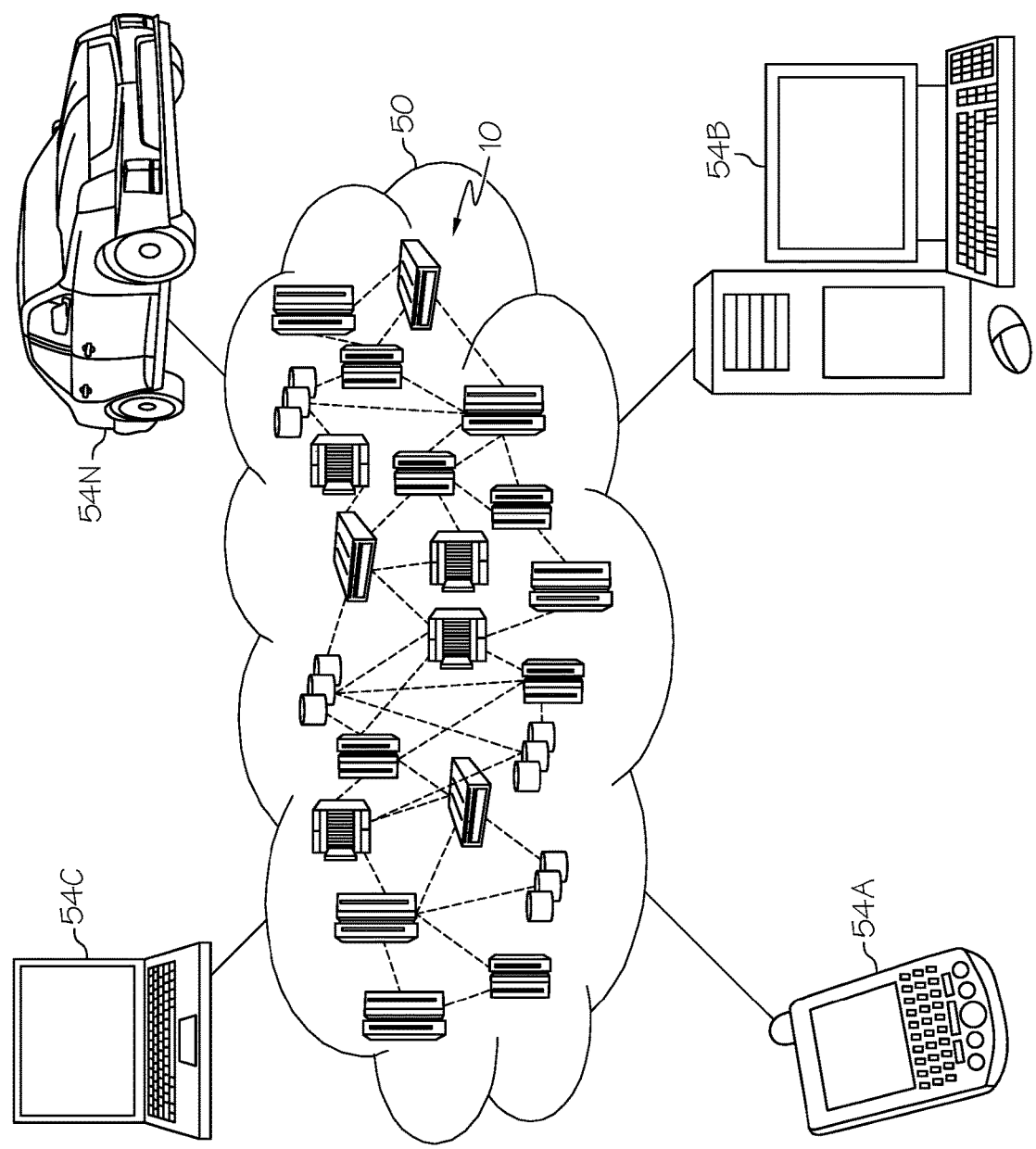
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning and identity record management and verification processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
utilizing, by an identity broker, a group membership of a client to select a set of policies for handling a client request, from the client, to retrieve and evaluate user identity information for confirming an identity of a particular entity;
selecting, by the identity broker, an identity network from multiple heterogeneous identity networks as a selected identity network to which the client request is to be sent, wherein the selected identity network is from a group of identity networks that includes a centralized identity network made up of a single trusted collection of identity profiles, a federated identity network that comprises a group of multiple trusted identity profiles that accurately represent attributes of identity records for the particular entity, a mobile identity network that includes a trusted identity domain that communicates with a mobile device, and a decentralized identity network that includes an identity trust fabric that allows multiple mobile devices, which are communicatively coupled to different trusted identity domains, to communicate among one another;
generating, by the identity broker, a trustworthiness ranking of veracity of information provided by each of the centralized identity network, the federated identity network, the mobile identity network, and the decentralized identity network;
transmitting, by the identity broker, the trustworthiness ranking of the selected identity network to the client;
evaluating, by the identity broker, a response to the client request, from the selected identity network, according to the set of policies to create an evaluated response, wherein the evaluated response conforms with the set of policies; and
transmitting, by the identity broker, the evaluated response to the client.

2. The method of claim 1, wherein the identity broker interfaces with the selected identity network via a network plugin that conforms with the set of policies, and wherein the network plugin is specifically for use with the selected identity network.

3. The method of claim 2, wherein the network plugin is a module within the identity broker.

4. The method of claim 1, wherein the set of policies includes a network-level mandatory policy, a custodian-level mandatory policy, and a member-level discretionary policy.

5. The method of claim 1, further comprising:
registering the selected identity network as a new identity network for use by the identity broker.

6. The method of claim 1, further comprising:
training a machine learning system to generate a confidence score for the evaluated response; and
transmitting, by the identity broker, the confidence score for the evaluated response to the client.

7. A computer program product comprising a computer readable storage medium having program code embodied therewith, wherein the computer readable storage medium is not a transitory signal per se, and wherein the program code is readable and executable by a processor to perform a method comprising:
utilizing a group membership of a client to select a set of policies for handling a client request, from the client, to retrieve and evaluate user identity information for confirming an identity of a particular entity;
selecting, based on the set of policies, an identity network from multiple heterogeneous identity networks as a selected identity network to which the client request is to be sent, wherein the selected identity network is from a group of identity networks that includes a centralized identity network made up of a single trusted collection of identity profiles, a federated identity network that comprises a group of multiple trusted identity profiles that accurately represent attributes of identity records for the particular entity, a mobile identity network that includes a trusted identity domain that communicates with a mobile device, and a decentralized identity network that includes an identity trust fabric that allows multiple mobile devices, which are communicatively coupled to different trusted identity domains, to communicate among one another;
generating a trustworthiness ranking of veracity of information provided by each of the centralized identity network, the federated identity network, the mobile identity network, and the decentralized identity network;
transmitting the trustworthiness ranking of the selected identity network to the client;
evaluating a response to the client request, from the selected identity network, according to the set of policies to create an evaluated response, wherein the evaluated response conforms with the set of policies; and
transmitting the evaluated response to the client.

8. The method of claim 1, wherein the particular entity is a person.

9. The method of claim 1, wherein the particular entity is a device.

10. The method of claim 1, wherein the particular entity is a software program.

11. The method of claim 1, wherein the selected identity network is a centralized identity network made up of a single trusted collection of identity profiles.

12. The method of claim 1, wherein the selected identity network is a federated identity network that comprises a group of multiple trusted identity profiles that accurately represent attributes of identity records for the particular entity.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
utilizing a group membership of a client to select a set of policies for handling a client request, from the client, to retrieve and evaluate user identity information for confirming an identity of a particular entity;
selecting, based on the set of policies, an identity network from multiple heterogeneous identity networks as a selected identity network to which the client request is to be sent, wherein the selected identity network is from a group of identity networks that includes a centralized identity network made up of a single trusted collection of identity profiles, a federated identity network that comprises a group of multiple trusted identity profiles that accurately represent attributes of identity records for the particular entity, a mobile identity network that includes a trusted identity domain that communicates with a mobile device, and a decentralized identity network that includes an identity trust fabric that allows multiple mobile devices, which are communicatively coupled to different trusted identity domains, to communicate among one another;
generating a trustworthiness ranking of veracity of information provided by each of the centralized identity network, the federated identity network, the mobile identity network, and the decentralized identity network;
transmitting the trustworthiness ranking of the selected identity network to the client;
evaluating a response to the client request, from the selected identity network, according to the set of policies to create an evaluated response, wherein the evaluated response conforms with the set of policies; and
transmitting the evaluated response to the client.

15. The method of claim 1, wherein the selected identity network is a mobile identity network that includes a trusted identity domain that communicates with a mobile device, and wherein the trusted identity domain delegates to the mobile device a decision as to which entities are allowed to retrieve certain identity profiles from the trusted identity domain.

16. The method of claim 1, wherein the selected identity network is a decentralized identity network that includes an identity trust fabric that allows multiple mobile devices, which are communicatively coupled to different trusted identity domains to communicate among one another, wherein each mobile device from the multiple mobile devices retrieves identity profiles from other trusted identity domains within the decentralized identity network.

17. The method of claim 1, further comprising:
identifying, by the identity broker, different policies used by the multiple heterogeneous identity networks for providing identity records to requesters;
selecting, by the identity broker, the multiple heterogeneous identity networks as selected identity networks to which the client request is to be sent;
evaluating, by the identity broker, a response to the client request from the selected multiple heterogeneous identity networks, according to the set of policies to create an evaluated response, wherein the evaluated response conforms with the different policies used by the multiple heterogeneous identity networks; and
transmitting, by the identity broker, the evaluated response from the selected multiple heterogeneous identity networks to the client.

18. The method of claim 1, wherein the evaluated response transmitted to the client comprises a verification identity record for a particular entity, a description of what type of identity network provided the verification identity record, and a description of a level of trustworthiness of the selected identity network.

19. The method of claim 1, further comprising:
determining that the identity broker is permitted to retrieve types of information found in a first identity network from the multiple heterogeneous identity networks;
determining that the identity broker is not permitted to retrieve types of information found in a second identity network from the multiple heterogeneous identity networks;
in response to determining that the identity broker is permitted to retrieve types of information found in the first identity network from the multiple heterogeneous identity networks but is not permitted to retrieve types of information found in the second identity network from the multiple heterogeneous identity networks, allowing the identity broker to search the first identity network but not the second identity network for the client.

* * * * *